(No Model.)

F. TAGGART.

MACHINE FOR DISINTEGRATING GRAIN, &c.

No. 250,999. Patented Dec. 13, 1881.

2 Sheets—Sheet 1.

Witnesses:
Edmond Brodhag
Howell C. Bartle

Inventor:
pro Francis Taggart,
Johnson & Johnson
Att'ys (No Model.)   2 Sheets—Sheet 2.

F. TAGGART.
MACHINE FOR DISINTEGRATING GRAIN, &c.

No. 250,999.   Patented Dec. 13, 1881.

Witnesses:
Edward Brodhag
Howell C. Bartle

Inventor:
pro Francis Taggart,
Johnson & Johnson
Att'ys.

UNITED STATES PATENT OFFICE.

FRANCIS TAGGART, OF BROOKLYN, NEW YORK.

MACHINE FOR DISINTEGRATING GRAIN, &c.

SPECIFICATION forming part of Letters Patent No. 250,999, dated December 13, 1881.

Application filed September 19, 1881. (No model.)

*To all whom it may concern:*

Be it known that I, FRANCIS TAGGART, a citizen of the United States, residing at Brooklyn, in the county of Kings and State of New York, have invented new and useful Improvements in Machines for Disintegrating Grain and Frangible Substances, of which the following is a specification.

In an application filed by me April 10, 1880, I have described and claimed a process for disintegrating cereals and other frangible substances and an apparatus for carrying the process into effect. The said process, in brief, consists in forcibly projecting the grains to be comminuted against a hard abutment or obstacle by the agency of a continuously-flowing powerful current of aeriform fluid, (usually compressed air,) into which the grains are introduced at a convenient point, whereby the latter are disintegrated, and then collecting into one channel the comminuted particles, while the accumulation of air is permitted to escape at a different point.

The specific matter of improvement herein embraces the combination, with an ejector, whereby particles of solid matter are impelled in a continuously-flowing current of aeriform fluid, and an inclosing-chamber, of a hard abutment or obstacle placed in said chamber and detachably secured, so as to facilitate its removal and the substitution of another as they become abraded by the action of the particles impelled against it. This facility of substitution of only the abutment or impediment is quite important in the practical and economical working of the machine, and may also include facility for adjustment in relation to the ejector.

In the annexed drawings, making a part of this specification, I have illustrated an apparatus adapted for working my process with a detachable abutment, and in which—

Figure 1:
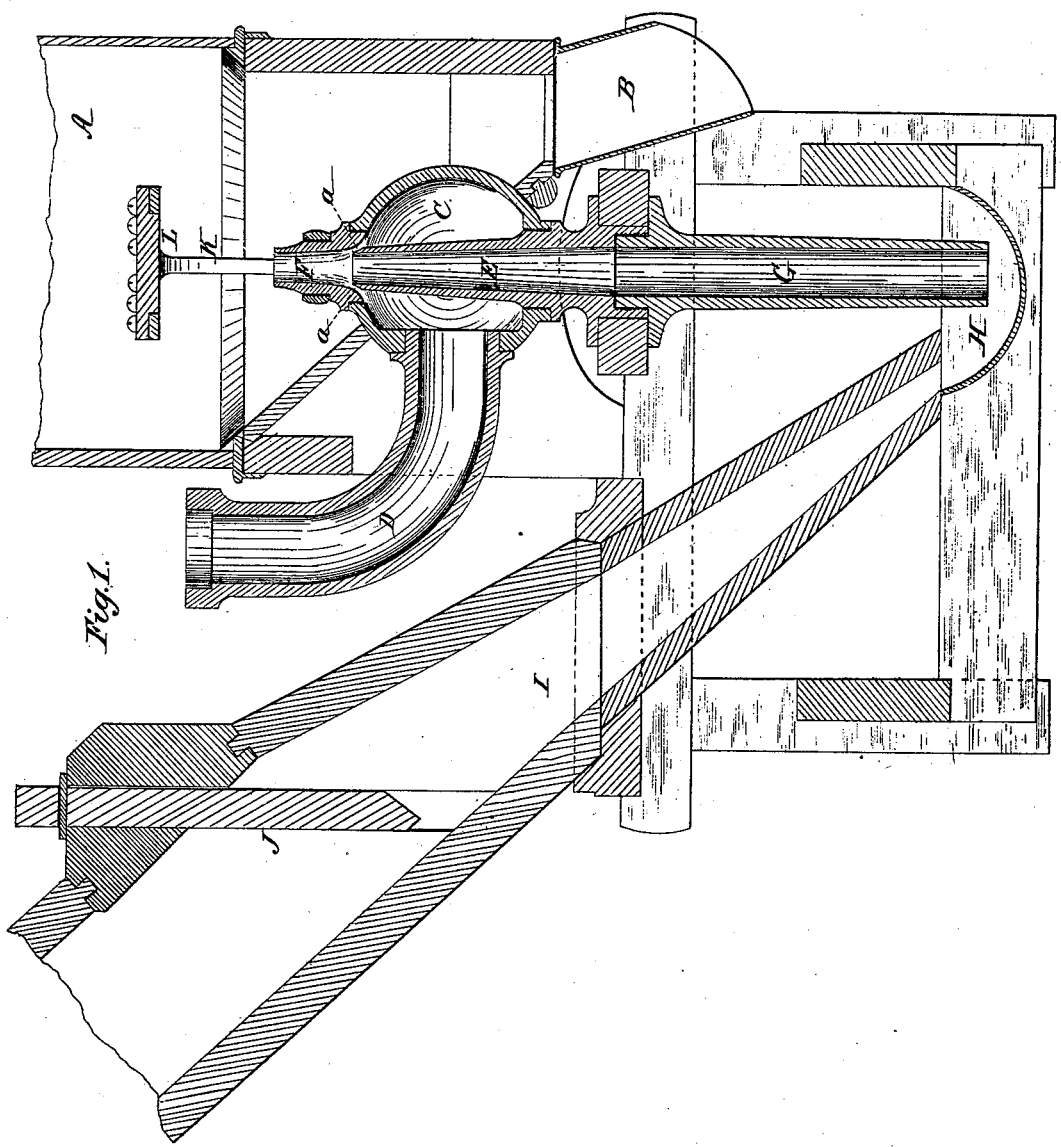
Figure 3:
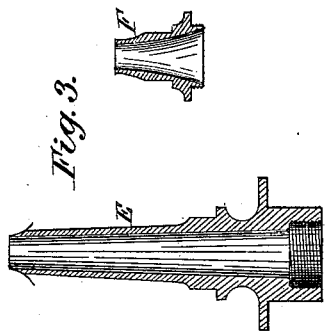
Figure 4:
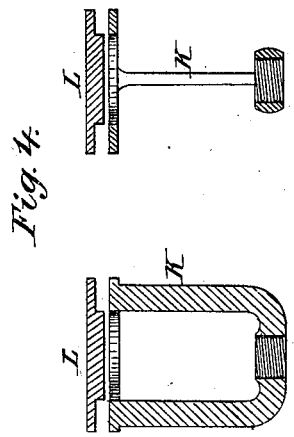
Figure 2:
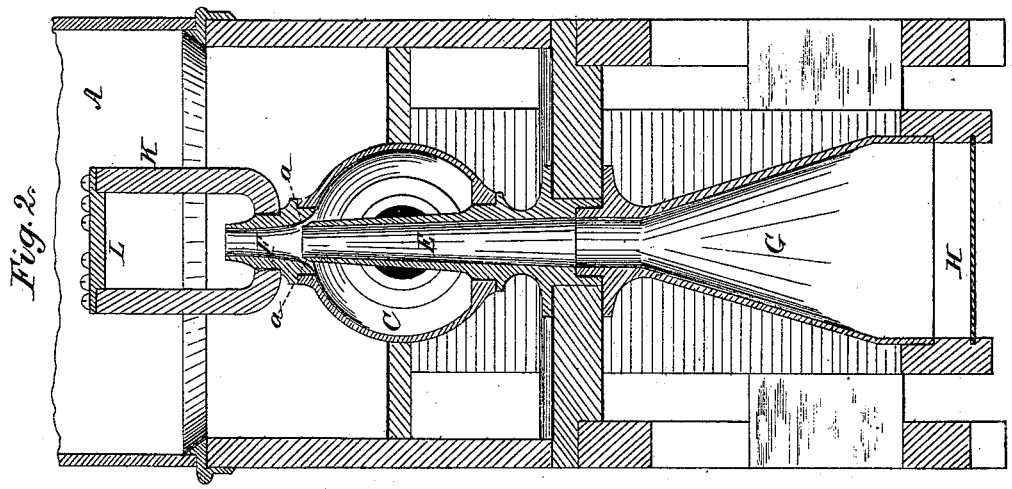

Figure 1 is a vertical longitudinal section. Fig. 2 is a vertical transverse section. Fig. 3 is a detached sectional view of the nozzle and supply-pipe; and Fig. 4 is a sectional view, showing the details of the detachable abutment and frame which carries it.

A is a chamber, which contains the detachable abutment or target, and is hoppered at the bottom and fitted with a discharge-pipe, B, through which the reduced particles collected in the chamber are discharged. The chamber, as illustrated, extends upward, so as to permit the expanded air to escape without carrying with it the products of reduction. This chamber is so constructed as to allow sufficient freedom for the outward passage of the air, while retaining in the chamber all, or nearly all, of the products of disintegration, whether such provision be made by the use of a large and high inclosure of pyramidal or conical form, and having sufficient capacity to allow of a very slow ascent of the air to the small outlet at the top, thus giving time for subsidence of the fine and lighter products of the disintegration, or by forming the inclosing walls or surrounding surfaces of the chamber of bunting or other pervious fibrous fabrics, or of perforated metal of such size of mesh or perforations as to allow the air to pass outward, while retaining within the chamber nearly or quite all of the fine products of disintegration. It is important that the air entering the chamber should pass out without causing any perceptible back-pressure upon the inflowing jet, and not by pressure and reaction retard the inflow of the air. It must be of such height above the abutment and the hopper end as to allow such time and space for the separation and subsidence of the fine flour as will prevent any considerable loss by flour-dust passing out with the outflowing air. The outlet for this purpose may be made adjustable as to size, so as to give the best economy under the judgment of the operator.

The abutment may be placed in a proper relation to the projecting device, either upon the wall of the chamber in which it is arranged or upon such device, and it may be made adjustable, if desired.

The apparatus is supported in a suitable frame, and the supply of compressed air in the spherical chamber is maintained by any suitable means.

The nozzle of the ejector F extends into the chamber, and delivers into it in continuous current the air or other medium and the solid pieces or grains to be reduced. This nozzle is attached to the chamber C, into which the air enters through the pipe D from any suitable compressor.

E is the grain-pipe, extending within the inner end of the nozzle F, but so arranged as to leave an annular opening at *a*, through which the air rushes, and, upon well-known principles, draws with it grain from the pipe E.

G is a pipe connecting the section E with a cup or receiver, H, which holds the grains or pieces to be reduced, the same being supplied by the fixed pipe I, the supply being regulated by a gate or valve, J, which enables the operator to regulate the feed, while not affecting its continuity. This part of the mechanism may, it is evident, be modified at will; or the grains may be fed directly by gravity simply by reversing the machine, so as to project the material down instead of up, as shown. The grains or pieces, when projected from the nozzle, are directed against the target or impediment L, which, in the case illustrated, is a plate of steel attached by screws to the frame K, which is a U-formed piece attached by a thread to the nozzle on which it is secured, and has a ring at the other end to receive the target L.

The target or abutment is likely to be rapidly affected by the abrasion of the material projected. It is important, therefore, that provision should be made for its ready removal and replacement. This may be done cheaply by the renewal of the plate L alone, or, if necessary, by substituting a new frame, K, and plate L.

I have stated that the abutment may be made adjustable, and it will be understood that such adjustment is for convenience in determining the proper relation as to distance from the discharging-nozzle for operation upon different grades of hard and soft substances. As shown, this adjustment may be made by the screw-connection of the frame K with the ejector-nozzle.

It will be understood that in operation the substance to be comminuted is fed continuously to the ejector-tube in regulated quantities, and that the air is let into and maintained under high pressure in the ejector-chamber from a suitable supply through the pipe D, which is provided with suitable regulating means.

This patent is intended to cover only the improvements which are made the subject of the respective claims. Other improvements, both in the application of the broad principle to more specific work in other processes and modification of the mechanism made by me, are the subject of other applications for Letters Patent.

What I claim as my invention, and desire to secure by Letters Patent, is—

1. In combination with an ejector, whereby grains or particles of solid matter are impelled in a continuously-flowing powerful current or jet of aeriform fluid, and an inclosing-chamber, a hard abutment or obstacle placed in said chamber and detachably secured, so as to facilitate the removal of one abutment and the substitution of another as they become abraded by use, substantially as set forth.

2. The combination of an ejector, whereby grains or particles are impelled in a continuously-flowing powerful current or jet of aeriform fluid, and an inclosing-chamber, with a hard abutment or obstacle placed in said chamber, and a detachable frame, whereby to carry and to permit of the ready removal of the abutment and its substitution by a new one.

3. The combination, in apparatus for disintegrating grain and frangible substances, of a fixed ejector of air for imparting momentum to the substance with an abutment or surface of impingement placed within a chamber and arranged and supported upon said ejector, substantially as set forth.

4. The combination, in apparatus for disintegrating grain and frangible substances, of a fixed ejector of air for imparting momentum to the substance with an abutment or surface of impingement adjustably placed within a chamber in relation to the ejector, substantially as set forth.

In testimony whereof I have hereunto set my hand in the presence of two subscribing witnesses.

FRANCIS TAGGART.

Witnesses:
I. HOLLINGSWORTH,
ELMER L. FORD.